United States Patent [19]
Bates et al.

[11] 4,448,373
[45] May 15, 1984

[54] ELASTOMERIC SWAY BRACING AND EJECTOR SYSTEM

[75] Inventors: Jack R. Bates; John W. Holtrop, both of Ridgecrest, Calif.

[73] Assignee: The United States of America as represented by the Secretary of the Navy, Washington, D.C.

[21] Appl. No.: 216,460

[22] Filed: Dec. 15, 1980

[51] Int. Cl.³ .............................................. B64C 1/22
[52] U.S. Cl. .............................................. 244/137 R
[58] Field of Search ................. 244/137 A, 137 R; 89/1.5 R, 1.5 B, 1.5 H; 410/49, 117, 119; 267/120; 248/356

[56] References Cited
U.S. PATENT DOCUMENTS

| 1,784,011 | 12/1930 | Jones . | |
| 2,468,009 | 4/1949 | Bigley, Jr. et al. | 244/137 R |
| 3,268,188 | 8/1966 | La Roe et al. | 244/118 |
| 3,480,237 | 11/1969 | Appleby | 244/130 |
| 3,494,247 | 2/1970 | Dilworth, III et al. | 89/1.5 |
| 3,611,865 | 10/1971 | Schallert | 89/1.5 R |
| 3,887,150 | 6/1975 | Jakubowski, Jr. | 244/137 R |
| 4,233,883 | 11/1980 | Miko | 89/1.5 B |

FOREIGN PATENT DOCUMENTS

| 503816 | 6/1954 | Canada | 244/137 R |
| 2414631 | 10/1974 | Fed. Rep. of Germany | 244/137 R |

Primary Examiner—Galen L. Barefoot
Assistant Examiner—Jesus D. Sotelo
Attorney, Agent, or Firm—R. F. Beers; W. T. Skeer; Kenneth G. Pritchard

[57] ABSTRACT

An elastomeric sway bracing and ejector system for aircraft is provided by two different apparatus. In one, an elastomeric cushion is placed on the aircraft in a position to be crushed by a carried aircraft store. In the other, an elastomeric bladder is filled with gas, which is compressed to the sway brace store. This acts as a cushion between the aircraft and the store. In both apparatus, the release of the store permits it to be ejected by the compressed force of the elastomeric material. Insertion of pressurized sections in the elastomeric cushion permit both the cushion and the bladder to be inflated by different air pressures to control the resilient force exerted against the store.

6 Claims, 10 Drawing Figures

ELASTOMERIC SWAY BRACING AND EJECTOR SYSTEM

BACKGROUND OF THE INVENTION

1. Field of the Invention

The present invention pertains to bracing for aircraft stores. In particular, the present invention pertains to elastomeric sway bracing for aircraft stores capable of providing ejection forces to separate the store from the aircraft upon release of the store.

2. Description of the Prior Art

Previous ejection devices for fighter aircraft either carried the device completely external to the aircraft or semisubmerged in the aircraft. The semisubmerged method permits a tradeoff between traditional bomber configurations which do not change the aerodynamic configuration of the aircraft by carrying the bombs internally and complete external carries which create a new aerodynamic body for the aircraft to drag along with it through the air. An example of the semisubmerged devices is U.S. Pat. No. 3,611,865 to Schallert. The Schallert patent uses traditional ejection mechanisms to withdraw a given store into the airframe of the body to a significant extent. Upon ejection of the store from the Schallert device, the cavity left by the store causes significant aerodynamic turbulence. To reduce this turbulence, an inflatable seal is used which expands upon release of the store to cover the cavity opening.

Modern aircraft rarely use the semisubmerged mountings because they add airframe requirements that become a permanent fixture to the aircraft. Modern high speed aircraft emphasize thin wings and sleek bodies with the minimum hardware contained therein. It is considered far more preferable to store bombs, rockets, and missiles externally. After launching the store, the airframe has the maximum performance characteristics possible. In addition, modern homing missile rely on target acquisition and guidance separate from the aircraft. The guidance devices are frequently locked on prior to ejection to improve the kill rate. Maintaining missiles external to the aircraft permits missile guidance capabilities to function as if the missile is free flying and still permit aircraft monitoring of missile guidance readout to assure the missile is properly locked on target.

External store mechanisms such as U.S. Pat. No. 3,887,150 to Jakubowski Jr. emphasize minimum aerodynamic area to control the sway bracing of the store. In addition, the containing device holding the store in place must also be responsible for not merely releasing the store at a given time but insuring that the store is able to depart the aircraft cleanly. Collision between the store and the aircraft can be damaging to the aircraft and result in complete loss of the store for its functional purpose.

Numerous ejecting devices have been patented which seek to both firmly lock the store to the aircraft during high speed flight and to provide forceful and predictable ejection of the store from the aircraft upon launch. Such devices provide competing functions to the same one or two aerodynamic tie points between the store and the aircraft. High speed loading effects cause large variations in store launching predictability.

SUMMARY OF THE INVENTION

Elastomeric sway bracing for firmly anchoring external stores to aircraft are created by using an elastomeric material such as rubber in either a cushion configuration or a bladder configuration. In the cushion configuration, the store is held to the aircraft by state-of-the-art ejection devices which forcefully pull the store against dual ridges of elastic sway bracing which are deformed by the store. This snug fit assures the store is both securely mounted to the aircraft but not in danger of rubbing against the aircraft at high air speeds. Upon release of the ejector mechanism, the elastomeric sway bracing seeks to regain its original form and exerts a predetermined resiliency force against the store pushing it away from the aircraft. By placing an elastomeric cushion along the length of the store, this resiliency force can be evenly applied along the entire length of a missile rather than at one or two points which might permit pivoting and thus collision between the missile and the aircraft at any given point.

The bladder method entails creating a multi-layer bladder of fabric in the elastomeric material, such as the bladder used in footballs and other well known types of air bladders. This bladder can be matched to the groove in an air wing or pylon to create a highly pressurized cushion along the length of the store against the airframe. Again upon release of the holding mechanism, the bladder can evenly press against the entire length of the store to insure uniform separation.

DESCRIPTION OF THE PREFERRED EMBODIMENT

Figure 1:
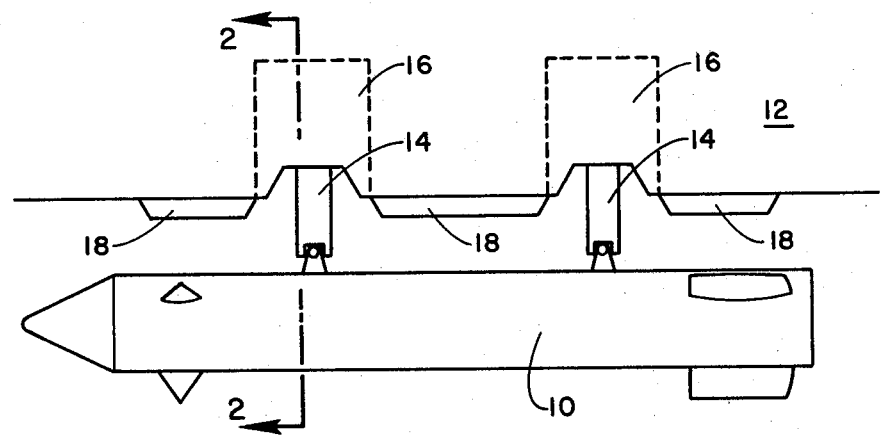
FIG. 1 shows a side view of an aircraft store underneath an airframe.

FIG. 1 shows a side view of an aircraft store 10 held to an airframe 12 by ejectors 14, which contain a mechanism for grasping the store's bomb lug. As shown in FIG. 1, ejectors 14 are extended to the position they would normally take for mounting stores to the aircraft. Prior to aircraft takeoff ejectors 14 will be withdrawn into wells 16 causing store 10 to be compressed against the elastomeric cushions 18. Elastomeric sway braces 18 are static and fastened directly to the aircraft. They require no manual operation. Since they are present along the length of store 10, they present a very large surface area to the store which minimizes point loading. The elastomeric material minimizes vibrations and shock transfer between store 10 and aircraft 12.

Figure 2A:
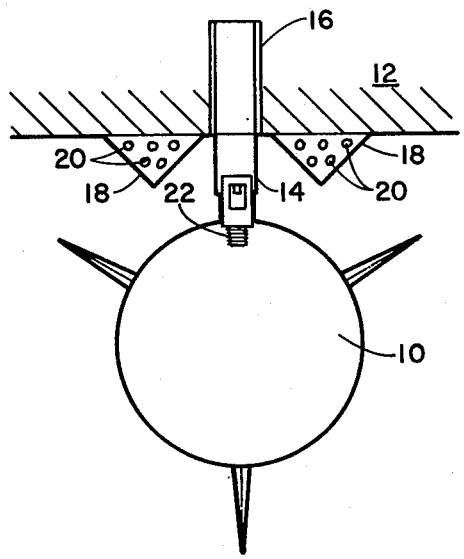
FIGS. 2A and 2B show an end on view of the device shown in FIG. 1.
Figure 2B:
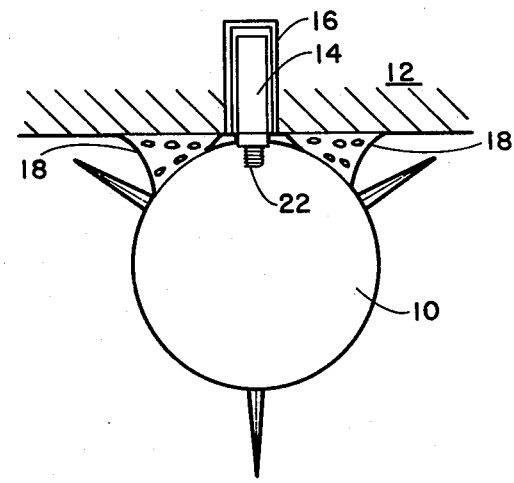

FIG. 2A shows an end on view of store 10 in the extended configuration shown in FIG. 1. Shown cross-sectionally in FIG. 2A is ejector 14 in well 16 as represented along line 2—2 of FIG. 1. Shown within elastomeric braces 18 are openings 20 which will be described below. FIG. 2B shows ejectors 14 withdrawn to the carry position of store 10. In this configuration, elastomeric braces 18 are shown deformed by the force holding store 10. As can be seen by threads 22, common bomb lugs are screwed into store 10 to provide an anchoring position.

Figure 3:
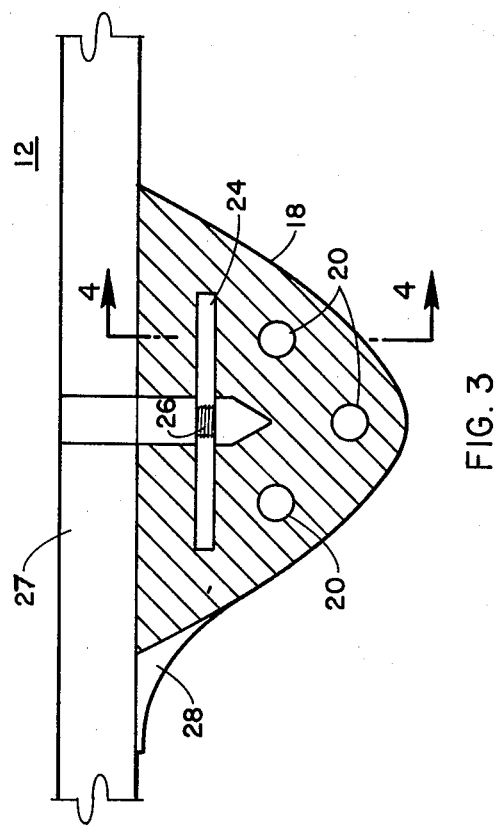
FIG. 3 shows an end cross-sectional view of the type of elastomeric cushion shown in FIG. 1 and FIG. 2.

FIG. 3 shows a method to mount elastomeric bracing 18 to an exterior surface 27 of aircraft 12. Elastomeric brace 18, which can be made of rubber or any other suitably resilient material, is shown with a steel plate 24 imbedded within it. Plate 24 has threads 26 which permit a bolt to pass through steel plate 24 and bolt elastomeric brace 18 firmly against skin 26. To insure smooth airflow on the surface area on externally to the aircraft, a thin metal shroud 28 may be added if desired. Shroud 28 is bolted to surface 27 in the normal fashion for external mountings on aircraft. Openings 20 are formed along the length of elastomeric brace 18 by extrusion or any other suitable method.

Figure 4:
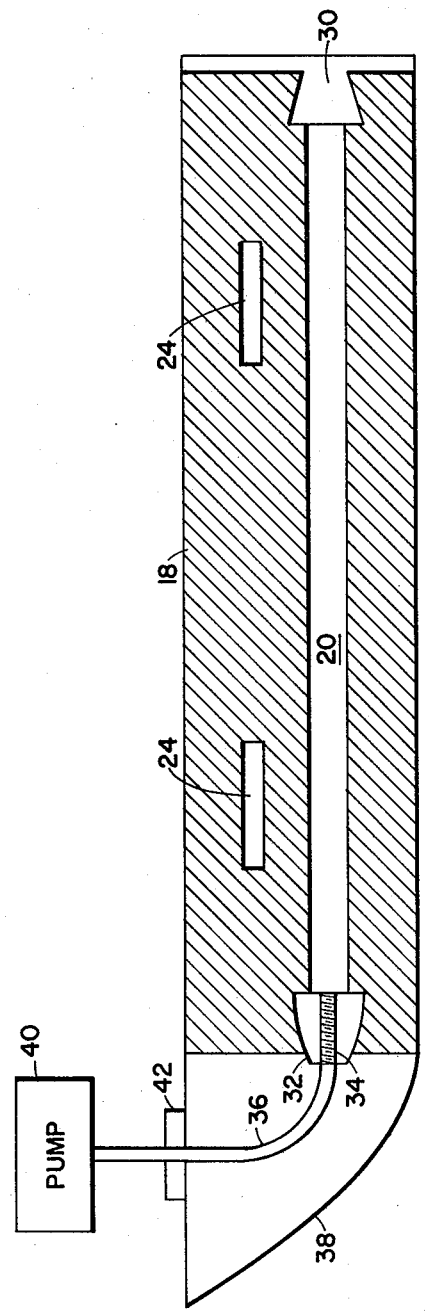
FIG. 4 shows a lengthwise cross-sectional view of the device shown in FIG. 1 and FIG. 3.

FIG. 4 shows a cross-section length-wise along the elastomer brace 18 as represented by line 4—4 of FIG. 3. Sealing one end of passage 20 is a plug 30 which can be pressure fit into the end of elastomeric brace 18 and heat treated if required to provide a firm pressure seal. At the opposite end of elastomeric brace 18, a pressure seal 32 with threaded opening 34 is inserted. Threaded into passage 34 is a pressure tube 36 supplying a pressurized gas into passage 20 from an hydraulic pump 40 which is connected to pressure seal 32 via a sealing plate 42. Enclosing tube 36 is a aerodynamic cover 38 which is mounted in front of elastomeric brace 18 to assure aerodynamic flow.

When store 10 is ejected, elastomer brace 18 remains in position in a flared or low drag configuration. Drag is also reduced during carriage due to elastomeric material sealing off airflow along the top of store 10. By regulating the pressure in passage 20, the degree of deformity in elastomeric brace 18 is controlled by fixing the resilient force available along the length of store 10 that is available to eject store 10 in the aircraft.

Figure 5:
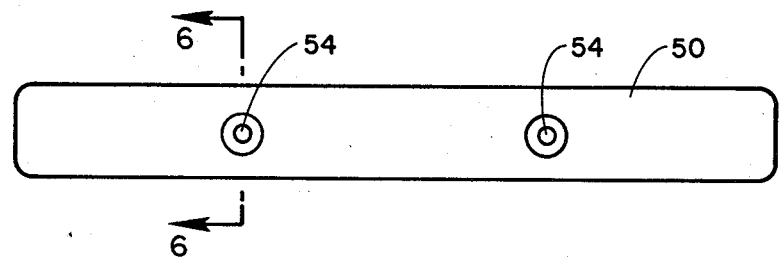
FIG. 5 shows an underneath view of the bladder configuration of the present invention.

An alternative configuration uses an inflated sway brace 50 as shown in FIG. 5. The inflated sway brace is an elastomeric bladder such as used in footballs and the like. Since the bladder will be undergoing far greater pressures than a football, it is required that construction be of a highly durable form, such as alternate layers of a fabric, such as nylon, and an elastic material, such as rubber.

Figure 6A:
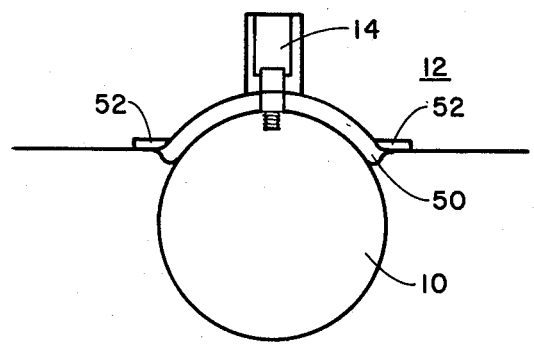
FIGS. 6A and 6B show an end on view of FIG. 5 along lines 6—6.
Figure 6B:
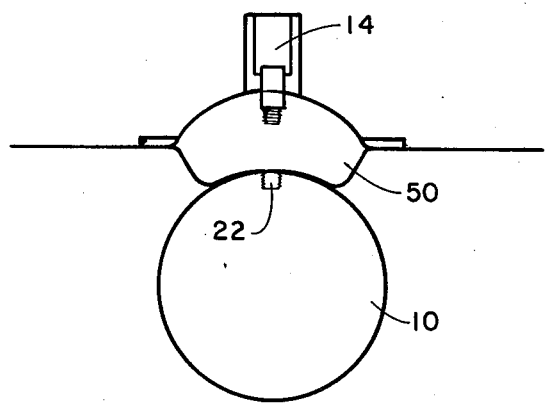

FIGS. 6A and 6B represent a view along 6—6 of FIG. 5 with a store 10 added beneath bladder 50. As shown in FIG. 6A, bladder 50 with the store withdrawn is compressed to a uniform seal between store 10 and aircraft 12. Bladder 50 is mounted along a ridge 52 within aircraft 12. Ejector 14 must now pass through two separate seals in bladder 50. These seals 54 are shown in FIG. 5. FIG. 6B shows how bladder 50 can be extended with store 10 unmounted. For convenience, bladder 50 should not be pressurized prior to insertion of ejector 14 into mounting screw 22.

Figure 7A:
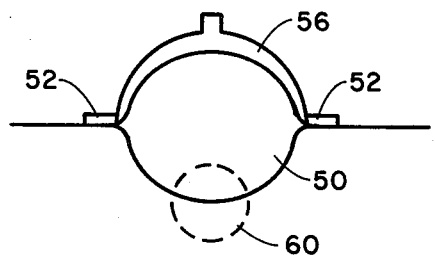
FIGS. 7A and 7B show a cross-sectional view of a bladder in an airframe and the enlarged cross-sectional view of the multi layers comprising a section of the bladder.
Figure 7B:
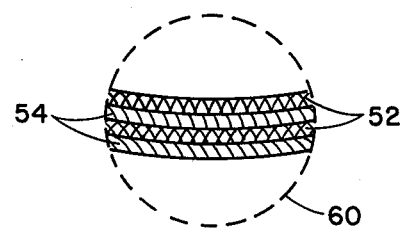

FIG. 7A shows a general configuration of bladder 50 within the recessed opening 56, which can be part of aircraft 12 or a pylon, whichever is desired for aircraft mounting. Circle 60 shows a blown up cross-sectional view of bladder 50 in FIG. 7B. A plurality of alternating layers of fabric 52 are shown with an elastic material 54. These alternating layers will give bladder 50 both a degree of flexibility and the strength required for bladder 50 to be crushed as shown in FIG. 6A. The pressure of bladder 50 can be adjusted such that upon release of store 10 bladder 50 will maintain an aerodynamic covering over opening 56.

Inflatable bladder 50 permits distribution of loading on a store surface similar to that of the elastomeric cushion discussed previously. The aerodynamic fairing improves aircraft performance by reducing drag. Once again, the ejection forces aid ejection of stores in a uniform manner to avoid collison between the store and aircraft. The bladder can be segmented similar to elastomeric bracing 18 as shown before.

It will be obvious to those skilled in the art that numerous modifications on the above invention can be made.

What is claimed is:

1. An elastomeric sway brace for mounting stores on external surfaces of aircraft comprising:
    an inflatable bladder on an external surface of said aircraft;
    means for inflating said bladder to a predetermined pressure;
    means for holding said stores against said bladder, said holding means connected through said bladder to the aircraft; and
    means for retracting said holding means so as to compress said bladder with said stores such that release of said stores by the holding means permits expansion of said compressed bladder to eject said stores.

2. An elastomeric sway brace for mounting stores on external surfaces of aircraft as described in claim 1 where said inflatable bladder comprises a plurality of sections capable of being inflated to different pressures.

3. An elastomeric sway brace for mounting stores on external surfaces of aircraft as described in either claim 1 or claim 2 where said inflatable bladder is comprised of a plurality of layers, said layers alternating between layers of nylon and layers of rubber.

4. An elastomeric sway brace for mounting stores on external surfaces of aircraft comprising:
    a deformable cushion with cavities mounted on an external surface of said aircraft, said cavities pressurized to vary the sway brace force in a predetermined manner;
    means for holding said store against said cushion, said holding means connected through said cushion to said aircraft; and
    means for retracting said holding means so as to compress said cushion with said stores, such that release of said stores by the holding means permits expansion of said compressed cushion to eject said stores.

5. An elastomeric sway brace for mounting stores on external surfaces of aircraft as described in claim 4 further comprising a pump for pressurizing said deformable cushion cavities, said pump connected to said cushion by a sealing plate.

6. An elastomeric sway brace for mounting stores on external surface of aircraft as described in either of claims 5 or 4 where said deformable cushion is placed on said aircraft by molding a threaded steel plate in said cushion, said threaded steel plate matching predetermined bolts on said aircraft.

* * * * *